(12) United States Patent
Fu

(10) Patent No.: US 11,804,918 B2
(45) Date of Patent: Oct. 31, 2023

(54) METHOD FOR ENHANCING UPLINK AND DOWNLINK COVERAGE BETWEEN A BASE STATION AND A USER TERMINAL, AND ELECTRONIC DEVICE

(71) Applicant: Nanning FuLian FuGui Precision Industrial Co., Ltd., Nanning (CN)

(72) Inventor: Dan Fu, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 141 days.

(21) Appl. No.: 17/566,238

(22) Filed: Dec. 30, 2021

(65) Prior Publication Data
US 2022/0321242 A1    Oct. 6, 2022

(30) Foreign Application Priority Data
Mar. 30, 2021    (CN) .......................... 202110341194.1

(51) Int. Cl.
| | |
|---|---|
| *H04W 72/04* | (2023.01) |
| *H04B 17/391* | (2015.01) |
| *H04W 64/00* | (2009.01) |
| *H04W 16/22* | (2009.01) |
| *H04W 72/0453* | (2023.01) |
| *H04B 17/373* | (2015.01) |
| *H04W 24/02* | (2009.01) |
| *H04W 72/50* | (2023.01) |

(52) U.S. Cl.
CPC ....... *H04B 17/3913* (2015.01); *H04B 17/373* (2015.01); *H04W 16/22* (2013.01); *H04W 24/02* (2013.01); *H04W 64/006* (2013.01); *H04W 72/0453* (2013.01); *H04W 72/535* (2023.01)

(58) Field of Classification Search
CPC .. H04W 72/04; H04B 17/347; H04B 17/3913
See application file for complete search history.

(56) References Cited

U.S. PATENT DOCUMENTS

| | | | |
|---|---|---|---|
| 9,668,274 B1 * | 5/2017 | Bartlett | ............ H04W 72/0453 |
| 2011/0230226 A1 | 9/2011 | Han et al. | |
| 2020/0259896 A1 | 8/2020 | Sachs et al. | |

OTHER PUBLICATIONS

Report ITU-R P.2346-0, Compilation of measurement data relating to building entry loss, May 2015 Tables 5, 10, 16, Figure 3, Chapters 2, 4.1, 5.2, 5.4, 8.1, 8.2.

* cited by examiner

*Primary Examiner* — Sulaiman Nooristany
(74) *Attorney, Agent, or Firm* — ScienBiziP, P.C.

(57) ABSTRACT

A method for enhancing uplink and downlink coverage is applied in a base station for the benefit of a terminal user. The base station receives from the user terminal an uplink scheduling request and GPS location. In response, the base station determines a penetration loss level of the GPS location, the penetration loss being attenuation of signals when signals penetrate an outer structure of a building. The base station further determines a transmission frequency of the uplink according to the penetration loss level which is set by reference to base station Tables of penetration loss for buildings and areas within its coverage area, and generates a scheduling strategy comprising the transmission frequency of the uplink, sending the scheduling strategy including the transmission frequency of the uplink to the user terminal for use in intercommunication.

6 Claims, 3 Drawing Sheets

METHOD FOR ENHANCING UPLINK AND DOWNLINK COVERAGE BETWEEN A BASE STATION AND A USER TERMINAL, AND ELECTRONIC DEVICE

CROSS-REFERENCE TO RELATED APPLICATIONS

This application claims priority to Chinese Patent Application No. 202110341194.1 filed on Mar. 30, 2021, in Chins State Intellectual Property Administration, the contents of which are incorporated by reference herein.

FIELD

The subject matter herein generally relates to wireless communication, to a field of 5G communications, and especially relates to a method for enhancing uplink and downlink coverage between a base station and a user terminal, and an electronic device.

BACKGROUND

In existing 5G communication methods, in order to solve a problem of uplink and downlink coverage of 5G signals being limited, a user terminal farther away from base station adopts low-frequency transmission of uplink data and high-frequency transmission of downlink data to enhance uplink and downlink coverage. A user terminal nearer the base stations can adopt high-frequency transmission of both uplink and downlink data. However, when any user terminal transmits uplink data at low frequency, although the uplink and downlink coverage may be enhanced, the slowed uplink transmission rate may still affect the user's internet experience.

BRIEF DESCRIPTION OF THE DRAWINGS

Implementations of the present disclosure will now be described, by way of embodiment, with reference to the attached figures.

DETAILED DESCRIPTION

Figure 1:
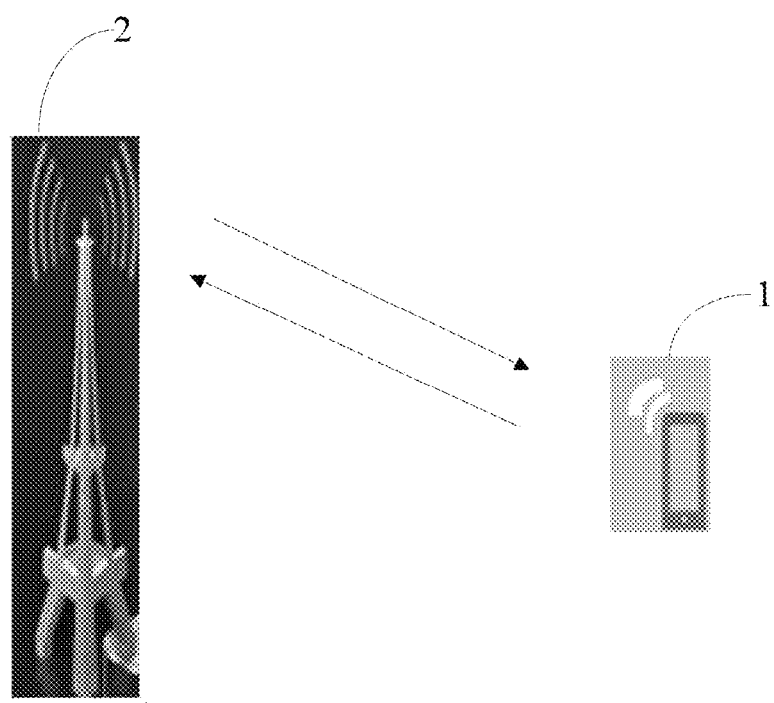
FIG. 1 is a running environment diagram of a method for enhancing uplink and downlink coverage between a base station and a user terminal according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a running environment of a method for enhancing uplink and downlink coverage. The method is applied in a user terminal 1 and a base station 2. The user terminal 1 is communicatively connected with the base station 2. For example, the user terminal 1 transmits uplink data to the base station 2 and/or receives downlink data transmitted by the base station 2. In one embodiment, the user terminal 1 can be a device such as a mobile phone, a tablet computer, a notebook computer, a wearable device or a desktop computer. The base station 2 is a 5G base station.

Figure 2:
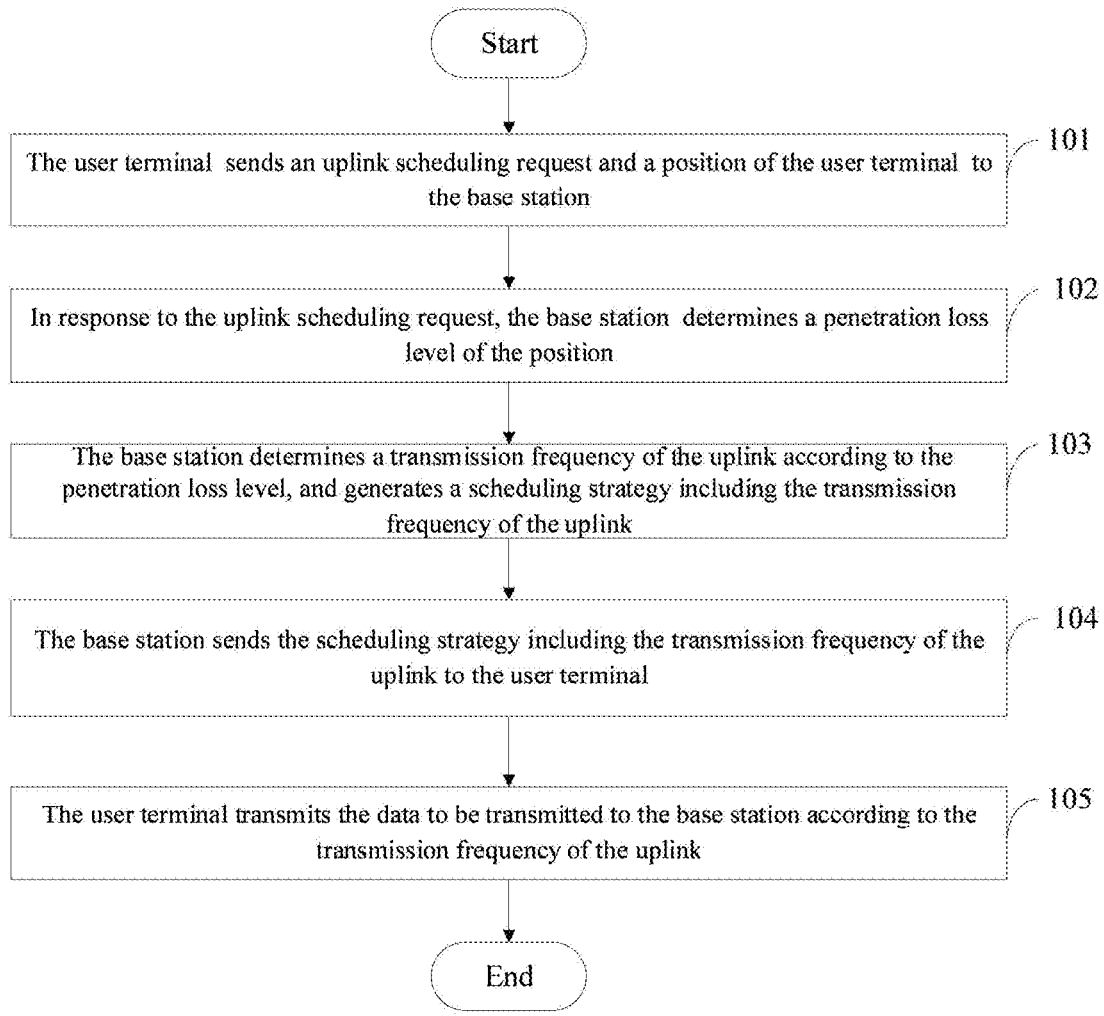
FIG. 2 is a flowchart of one embodiment of the method for enhancing uplink and downlink coverage between a base station and a user terminal according to the present disclosure.

FIG. 2 illustrates the method of this disclosure for enhancing uplink and downlink coverage. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, when detecting that data is to be transmitted, the user terminal 1 sends an uplink scheduling request and a location of the user terminal 1 to the base station 2.

In one embodiment, the uplink scheduling request includes Channel State Information (CSI) and Sounding Reference Signal (SRS). In one embodiment, the CSI includes channel characteristic information. For example, the CSI includes information as to signal scattering and attenuation of signal energy with distance.

In one embodiment, the user terminal 1 obtains the location of the user terminal 1 according to a GPS positioning device set in the user terminal 1. When detecting that data needs to be transmitted, user terminal 1 sends the location of the user terminal 1 and the uplink scheduling request to the base station 2.

At block 102, in response to the uplink scheduling request, the base station 2 determines a penetration loss level of the position.

In one embodiment, a building-based penetration loss exists in any uplink or downlink between the user terminal 1 and the base station 2. The penetration loss of the building is the attenuation of signals transmitted by the user terminal 1 and the base station 2 when the signals penetrate an outer structure of a building. The penetration loss affects an uplink coverage and a downlink coverage between the user terminal 1 and the base station 2. In one embodiment, the penetration loss of the building is equal to a difference between a first median of field strength outside the building and a second median of field strength inside the building. The penetration loss of the building is related to a structure of the building, types and sizes of doors and windows of the building, and height of the building. In one embodiment, the higher the frequency of signals used in the uplink or downlink, the greater will be the penetration loss.

In one embodiment, the base station 2 determining a penetration loss level of the position includes: the base station 2 determining whether a distance between the user terminal 1 and the base station 2 exceeds a preset distance range according to the location of the user terminal 1; when the distance between the user terminal 1 and the base station 2 exceeds the preset distance range, the base station 2 querying a first relationship table 20 to determine the penetration loss level of the position, where the first relationship table 20 defining relationships between different locations and different levels of penetration loss; when the distance between the user terminal 1 and the base station 2 is within the preset distance range, the penetration loss level being placed at a preset level.

In one embodiment, when the user terminal 1 is located in surroundings of a building with a metal shell structure or a special metal frame structure and in a metropolitan area, the base station 2 determines that the penetration loss level corresponding to such location is a first loss level. When the user terminal 1 is located in the surroundings of a building with a reinforced concrete structure and in the metropolitan area, the base station 2 determines that the penetration loss level corresponding to the position is a second loss level. When the user terminal 1 is located in the surroundings of a building with reinforced concrete structure and in a medium-sized urban area, the base station 2 determines that the penetration loss level corresponding to the location is a third loss level. When the user terminal 1 is located in an empty area, the base station 2 determines that the penetration loss level corresponding to the location is a fourth loss level. In one embodiment, the base station 2 stores a dot matrix map or an electronic map recording the location of the buildings within its coverage. When the distance between the user terminal 1 and the base station 2 exceeds the preset distance range, the base station 2 queries the dot matrix map or the electronic map according to the location of the user terminal 1 to determine the surroundings of the position of the user terminal 1. The first relationship table 20 is also queried as to the surroundings of the user terminal 1 to determine the penetration loss level corresponding to the position. In one embodiment, a penetration loss value of the first loss level is greater than that of the second loss level, the penetration loss value of the second loss level is greater than that of the third loss level, and the penetration loss value of the third loss level is greater than that of the fourth loss level. In one embodiment, the preset level is the same as the fourth loss level.

At block 103, the base station 2 determines a transmission frequency of the uplink according to the penetration loss level, and generates a scheduling strategy including the transmission frequency of the uplink.

In one embodiment, the base station 2 determining the transmission frequency of the uplink according to the penetration loss level includes: the base station 2 querying a second relationship table 30 according to the penetration loss level to determine the transmission frequency of the uplink corresponding to the penetration loss level, where the second relationship table 30 defines penetration loss levels and respective transmission frequencies of the uplink.

In one embodiment, when the penetration loss level is the first loss level, the base station 2 determines that the transmission frequency of the uplink corresponding to the first loss level is 1.8 GHz. When the penetration loss level is the second loss level, the base station 2 determines that the transmission frequency of the uplink corresponding to the second loss level is between 1.8 GHz and 2.3 GHz. When the penetration loss level is the third loss level, the base station 2 determines that the transmission frequency of the uplink corresponding to the third loss level is between 2.3 GHz and 3.5 GHz. When the penetration loss level is the fourth loss level or the preset level, the base station 2 determines that the transmission frequency of the uplink corresponding to the fourth loss level or the preset level is 3.5 GHz.

At block 104, the base station 2 sends the scheduling strategy including the transmission frequency of the uplink to the user terminal 1.

At block 105, the user terminal 1 transmits the data to be transmitted to the base station 2 according to the transmission frequency of the uplink.

In one embodiment, the method further includes: the base station 2 determining a reception frequency of the downlink according to the uplink scheduling request and sending the reception frequency of the downlink to the user terminal 1; and the user terminal 1 receiving data transmitted by the base station 2 according to the reception frequency of the downlink. In one embodiment, the reception frequency is 3.5 GHz.

The base station 2 in the present application can determine the penetration loss level of the surroundings the user terminal 1 according to the location of the user terminal 1, and determine the transmission frequency of the uplink according to the level of penetration loss. The user terminal 1 sends the data to be transmitted to the base station 2 according to the uplink transmission frequency determined by the base station 2, so as to enhance the uplink and downlink coverage of the signal, and avoid the problem of uplink and downlink coverage being unbalanced caused by a long distance between the user terminal 1 and the base station 2. Furthermore, the user terminal 1 can select appropriate transmission frequency of the uplink to transmit data according to the location of the user terminal 1, which improves the data transmission rate.

Figure 3:
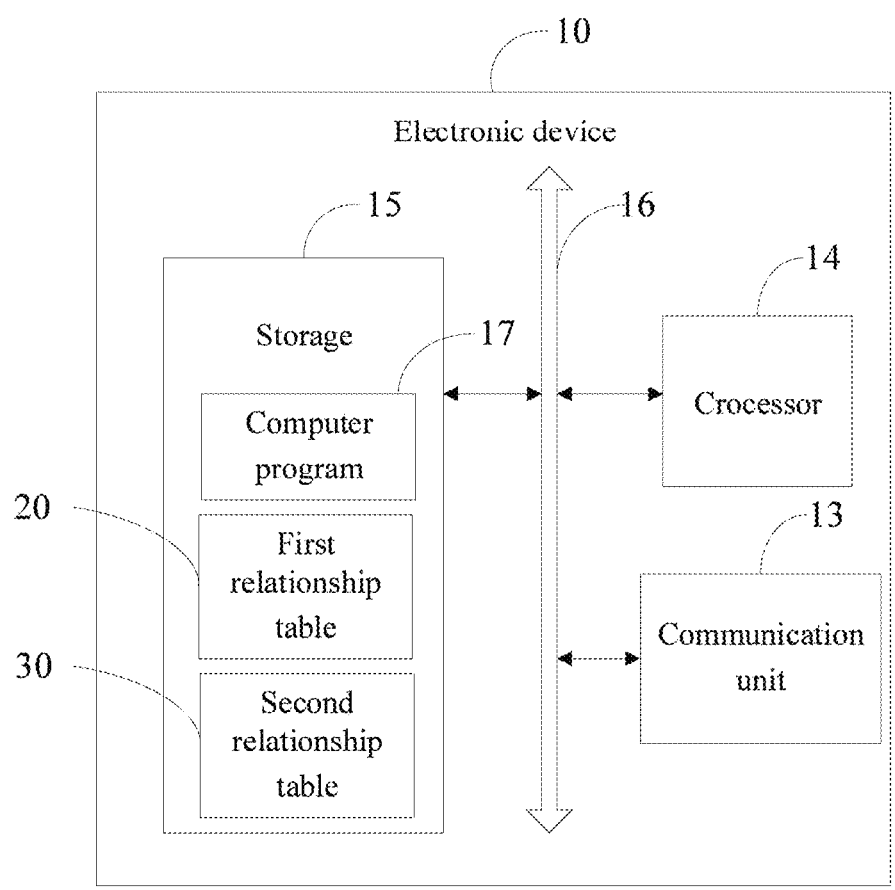
FIG. 3 is a schematic diagram of one embodiment of an electronic device according to the present disclosure.

FIG. 3 illustrates the electronic device 10. The electronic device 10 includes a communication unit 13, a processor 14, a storage 15, and a computer program 17. The communication unit 13, the processor 14, the storage 15 may be connected by one or more communication buses 16. In one embodiment, the communication unit 13 is a 5G communication module. The storage 15 is used to store one or more computer programs 17, the first relationship table 20, and the second relationship table 30. One or more computer programs 17 are configured to be executed by the processor 14. The one or more computer programs 17 include a plurality of instructions. When the plurality of instructions are executed by the processor 14, the method for enhancing uplink and downlink coverage executed on the electronic device 10 can be realized, achieving the function of enhancing uplink and downlink coverage of the electronic device 1. In one embodiment, the electronic device 10 includes a user terminal 1 and/or a base station 2.

In one embodiment, a computer storage medium in which computer instructions are stored is also disclosed. When the computer instructions are executed on the electronic device 10, the electronic device 10 is caused to execute the above related steps of the method to realize the method for enhancing uplink and downlink coverage in above embodiment.

In one embodiment, the present application also provides a computer program product. When the computer program product is executed on the computer, the computer is caused to perform the above related steps of the method to realize the method.

In one embodiment, the present application also provides a device, which can be a chip, component or module, and the device can include a connected processor and a storage. The storage is used to store computer execution instructions. When the device is running, the processor can execute the computer execution instructions stored in the storage to enable the chip to execute the method for enhancing uplink and downlink coverage in the above embodiments.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method of enhancing uplink and downlink coverage between a base station and a user terminal, applicable in the base station, the method comprising:
   receiving an uplink scheduling request and a location of the user terminal sent by the user terminal;
   in response to the uplink scheduling request, determining a penetration loss level of the position, wherein the penetration loss is an attenuation of signals transmitted by the user terminal and the base station when the signals penetrating an outer structure of a building;
   determining a transmission frequency of the uplink according to the penetration loss level, and generating a scheduling strategy comprising the transmission frequency of the uplink; and
   sending the scheduling strategy comprising the transmission frequency of the uplink to the user terminal;
   wherein determining the penetration loss level of the position according to the location of the user terminal comprises: determining whether a distance between the user terminal and the base station exceeds a preset distance range according to the location of the user terminal;
   when the distance exceeds the preset distance range, querying a first relationship table according to the location of the user terminal, and determining the penetration loss level of the position, and the first relationship table defining relationships between locations and respective levels of penetration loss; and
   when the distance is within the preset distance range, setting the penetration loss level to a preset level;
   wherein determining the transmission frequency of the uplink according to the penetration loss level comprises: querying a second relationship table according to the penetration loss level, and determining the transmission frequency of the uplink corresponding to the penetration loss level, the second relationship table defining penetration loss levels and respective transmission frequencies of the uplink;
   wherein querying the first relationship table according to the location of the user terminal, and determining the penetration loss level of the position comprises:
   when the user terminal is located in the building with a metal shell structure or a special metal frame structure in a metropolitan area, determining that the penetration loss level corresponding to the position is a first loss level;
   when the user terminal is located in the building with a reinforced concrete structure in the metropolitan area, determining that the penetration loss level corresponding to the position is a second loss level;
   when the user terminal is located in the building with reinforced concrete structure in a medium-sized urban area, determining that the penetration loss level corresponding to the location is a third loss level; and
   when the user terminal is located in an empty area, determining that the penetration loss level corresponding to the location is a fourth loss level;
   wherein querying the second relationship table according to the penetration loss level and determining the transmission frequency of the uplink corresponding to the penetration loss level comprises: when the penetration loss level is the first loss level, determining that the transmission frequency of the uplink corresponding to the first loss level is 1.8 GHz;
   when the penetration loss level is the second loss level, determining that the transmission frequency of the uplink corresponding to the second loss level is between 1.8 GHz and 2.3 GHz;
   when the penetration loss level is the third loss level, determining that the transmission frequency of the uplink corresponding to the third loss level is between 2.3 GHz and 3.5 GHz; and
   when the penetration loss level is the fourth loss level or the preset level, determining that the transmission frequency of the uplink corresponding to the fourth loss level or the preset level is 3.5 GHz.

2. The method as recited in claim 1, further comprising:
   determining a reception frequency of a downlink according to the uplink scheduling request; and
   sending the reception frequency of the downlink to the user terminal.

3. The method as recited in claim 2, wherein the reception frequency is 3.5 GHz.

4. An electronic device comprising:
   a processor; and
   a non-transitory storage medium coupled to the processor and configured to store a plurality of instructions, which cause the processor to:
   receive an uplink scheduling request and a location of a user terminal sent by the user terminal;
   in response to the uplink scheduling request, determine a penetration loss level of the position, and penetration loss is an attenuation of signals transmitted by the user terminal and the base station when the signals penetrating an outer structure of a building;
   determine a transmission frequency of the uplink according to the penetration loss level, and generate a scheduling strategy comprising the transmission frequency of the uplink; and
   send the scheduling strategy including the transmission frequency of the uplink to the user terminal;
   wherein the plurality of instructions are further configured to cause the processor to: determine whether a distance between the user terminal and the base station exceeds a preset distance range according to the location of the user terminal;

when the distance exceeds the preset distance range, query a first relationship table according to the location of the user terminal, and determine the penetration loss level of the position, wherein the first relationship table defines relationships between locations and respective levels of penetration loss; and when the distance is within the preset distance range, set the penetration loss level to a preset level;

wherein the plurality of instructions are further configured to cause the processor to: query a second relationship table according to the penetration loss level, and determine the transmission frequency of the uplink corresponding to the penetration loss level, wherein the second relationship table defines penetration loss levels and respective transmission frequencies of the uplink;

wherein the plurality of instructions are further configured to cause the processor to: when the user terminal is located in the building with a metal shell structure or a special metal frame structure in a metropolitan area, determine that the penetration loss level corresponding to the position is a first loss level;

when the user terminal is located in the building with a reinforced concrete structure in the metropolitan area, determine that the penetration loss level corresponding to the position is a second loss level;

when the user terminal is located in the building with reinforced concrete structure in a medium-sized urban area, determine that the penetration loss level corresponding to the location is a third loss level;

when the user terminal is located in an empty area, determine that the penetration loss level corresponding to the location is a fourth loss level;

wherein the plurality of instructions are further configured to cause the processor to: when the penetration loss level is the first loss level, determine that the transmission frequency of the uplink corresponding to the first loss level is 1.8 GHz;

when the penetration loss level is the second loss level, determine that the transmission frequency of the uplink corresponding to the second loss level is between 1.8 GHz and 2.3 GHz;

when the penetration loss level is the third loss level, determine that the transmission frequency of the uplink corresponding to the third loss level is between 2.3 GHz and 3.5 GHz; and when the penetration loss level is the fourth loss level or the preset level, determine that the transmission frequency of the uplink corresponding to the fourth loss level or the preset level is 3.5 GHz.

5. The electronic device as recited in claim 4, wherein the plurality of instructions are further configured to cause the processor to:

determine a reception frequency of a downlink according to the uplink scheduling request; and send the reception frequency of the downlink to the user terminal.

6. The electronic device as recited in claim 5, wherein the reception frequency is 3.5 GHz.

\* \* \* \* \*